(12) United States Patent
Barna et al.

(10) Patent No.: US 6,873,363 B1
(45) Date of Patent: Mar. 29, 2005

(54) TECHNIQUE FOR FLAGGING OVERSATURATED PIXELS

(75) Inventors: Sandor L. Barna, Pasadena, CA (US); Eric R. Fossum, La Crescenta, CA (US)

(73) Assignee: Micron Technology Inc., Boise, ID (US)

( * ) Notice: Subject to any disclaimer, the term of this patent is extended or adjusted under 35 U.S.C. 154(b) by 0 days.

(21) Appl. No.: 09/505,645

(22) Filed: Feb. 16, 2000

Related U.S. Application Data
(60) Provisional application No. 60/120,423, filed on Feb. 16, 1999.

(51) Int. Cl.[7] .................................................. H04N 3/14
(52) U.S. Cl. ..................................................... 348/308
(58) Field of Search ............................... 348/241, 607, 348/251, 615, 302, 297, 308, 294; 341/155; 250/208.1

(56) References Cited

U.S. PATENT DOCUMENTS

| | | | | |
|---|---|---|---|---|
| 5,565,915 A | * | 10/1996 | Kindo et al. ................. | 348/308 |
| 6,166,367 A | * | 12/2000 | Cho .......................... | 250/208.1 |
| 6,177,962 B1 | * | 1/2001 | Rumreich et al. ........... | 348/648 |
| 6,246,436 B1 | * | 6/2001 | Lin et al. .................... | 348/308 |
| 6,307,195 B1 | * | 10/2001 | Guidash ................... | 250/208.1 |
| 6,330,030 B1 | * | 12/2001 | O'Connor ................... | 348/297 |
| 6,344,877 B1 | * | 2/2002 | Gowda et al. .............. | 348/245 |
| 6,535,247 B1 | * | 3/2003 | Kozlowski et al. ......... | 348/241 |
| 6,803,958 B1 | * | 10/2004 | Wang ......................... | 348/308 |

* cited by examiner

*Primary Examiner*—Wendy R. Garber
*Assistant Examiner*—Rashawn N Tillery
(74) *Attorney, Agent, or Firm*—Dickstein Shapiro Morin & Oshinsky LLP (57) ABSTRACT

An active pixel sensor (APS) that includes circuitry to eliminate artifacts in digital images. The APS includes a comparator for comparing a signal level from a pixel to an adjusted saturation voltage to determine if the pixel is saturated. If the pixel is saturated, an associated saturation flag is stored and used to replace the signal from the pixel with a maximum value corresponding to a brightest pixel in the image.

10 Claims, 5 Drawing Sheets

TECHNIQUE FOR FLAGGING OVERSATURATED PIXELS

CROSS REFERENCE TO RELATED APPLICATION

This application claims the benefit of the U.S. Provisional Application No. 60/120,423 entitled TECHNIQUE FOR FLAGGING OVERSATURATED PIXELS filed on Feb. 16, 1999.

TECHNICAL FIELD

This invention relates to digital imaging sensors, and more particularly to active-pixel sensors.

BACKGROUND

Charge coupled devices (CCD) have traditionally been the imagers of choice for high quality imaging devices due to their high sensitivity and fill-factor. However, the standard CCD formation process often is incompatible with CMOS processing. Accordingly, it is impractical to integrate on-chip signal processing electronics in a CCD imager and the signal processing electronics must be provided off-chip.

CCDs are essentially electronic analog shift registers. CCDs include rows of photodetectors that act essentially as capacitors. Each pixel converts light energy into a charge, and then transfers that charge sequentially across a row of pixels into a single charge amplifier. This operation requires nearly perfect charge transfer efficiency, resulting in slow readout rates and relatively large power requirements.

Active pixel sensor (APS) devices are described in U.S. Pat. No. 5,417,515. These include an array of pixel cells that convert light energy into electrical signals. Each pixel includes a photodetector and one or more active. APS imaging devices are compatible with complementary metal oxide semiconductor (CMOS) technology.

Conventional CMOS imaging devices can be prone to producing artifacts in the resulting image. Artifacts are areas in the image that correspond to areas of the sensor that have been exposed to extremely high light levels. Artifacts appear black in the image when in fact they should be the brightest objects in the image.

Artifacts are produced by highly oversaturated pixels in the APS. Oversaturated pixels are pixels that are exposed to more light energy than the pixel's photodetector can absorb during exposure time.

APS devices can be operated in a double-sampling mode, in which the difference between the reset voltage and the signal voltage determines the brightness of the pixel. At zero light level, the signal value does not drop from the reset voltage and hence the difference voltage is zero, producing a black pixel. As the signal voltage drops, the difference voltage increases and the pixel brightens.

At high light levels, the signal voltage saturates at a saturation voltage V.sat.

The reset voltage also drops in response to incident light but at a much lower rate than the signal voltage. At very high light levels, the reset voltage begins to decrease significantly. At extremely high light levels reset voltage R will also saturate at V.sat. At this point, the difference voltage is zero, which produces a black pixel.

This is mainly a problem in very high contrast images. The extreme brightness of the sun will cause this effect in virtually all CMOS imagers, even at very short integration times. This is a disconcerting effect in outdoor imaging situations, in which the sun is often accidentally included in the field of view.

Figure 1:
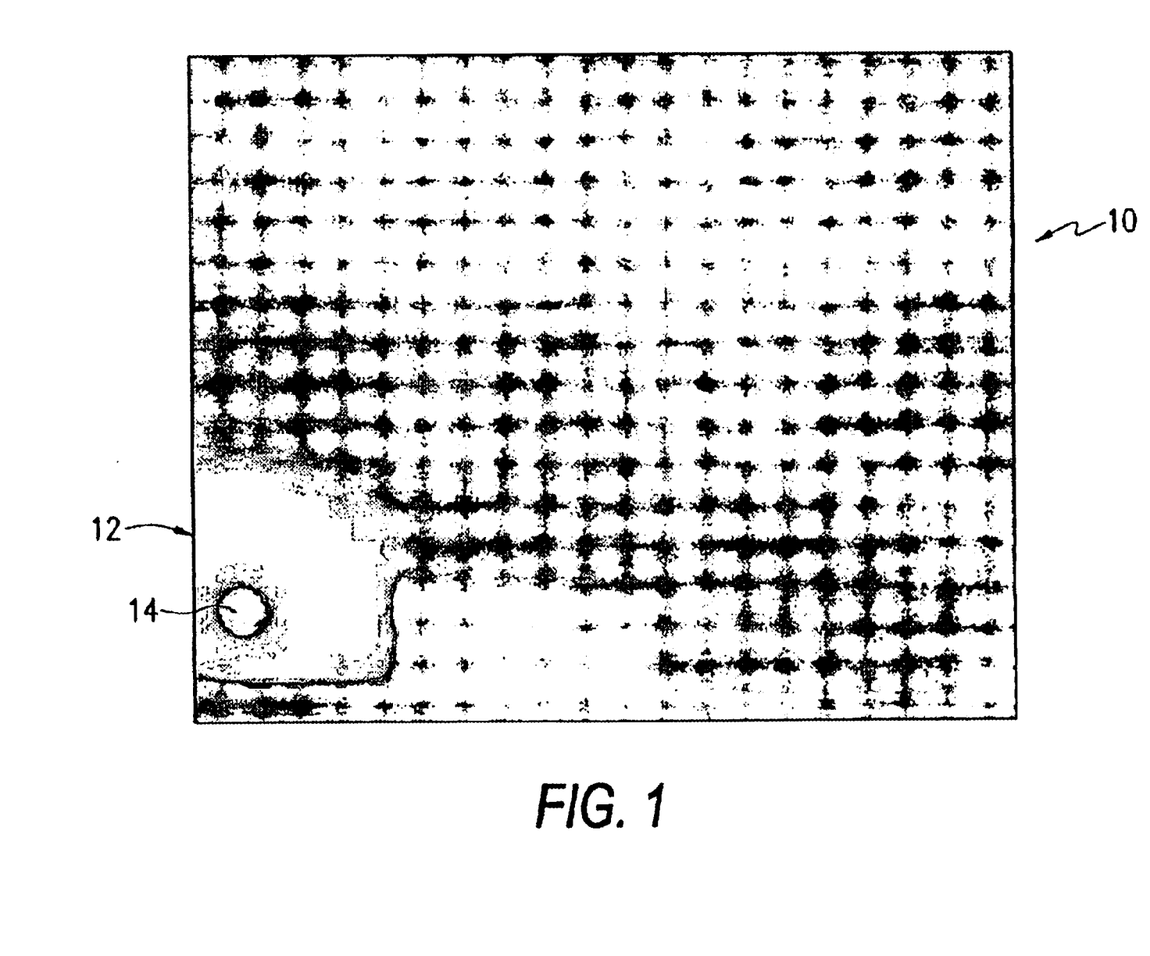
FIG. 1 is a digital image including an artifact produced in the center of the sun caused by oversaturated pixels.

FIG. 1 illustrates such a situation in a digital image 10 produced using a conventional APS CMOS imager. The presence of the sun 12 in the image produces an artifact 14 in which the center of the sun appears black.

SUMMARY

According to an embodiment of the invention, an active pixel sensor (APS) includes a pixel with a photodetector that converts a charge on the photodetector into a voltage, a sample and hold element for sampling and storing a signal voltage from the pixel during a readout operation, and a comparator for comparing the signal voltage to an adjusted saturation voltage to determine if the pixel is saturated.

According to another embodiment of the invention, a saturation flag is associated with the pixel and stored if the adjusted saturation voltage exceeds the signal voltage.

According to yet another embodiment of the invention, a difference voltage is determined for the pixel from the read out signal voltage and reset voltage. An analog-to-digital converter is provided for converting the difference voltage into a digital difference value. This digital difference value is replaced with a maximum digital value for pixels in the APS in the event a saturation flag is detected for that pixel.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Oversaturated pixels in an active pixel sensor (APS) imaging device can produce artifacts in the resulting images in high contrast situations. Artifacts are objects in the image that appear black, but in fact should be the brightest objects in the image.

According to the present embodiment, oversaturated pixels in an APS pixel array are flagged during readout. The saturation flag can be used to identify oversaturated pixels and replace the value read out from oversaturated pixels with a predetermined maximum value corresponding to a maximum brightness for the pixels in the image. This removes the artifacts in the resulting image, and the pixels in the APS array that receive the most light appear brightest in the images that are produced.

Figure 2:
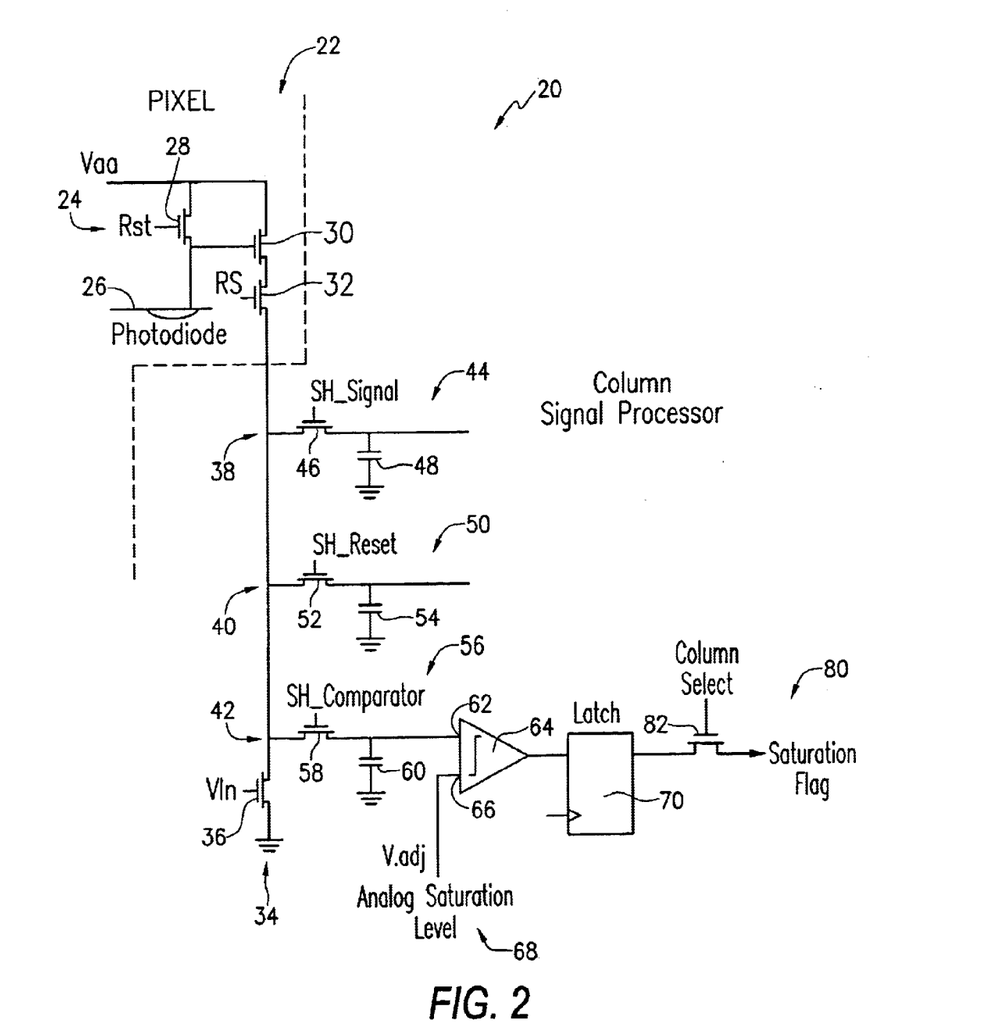
FIG. 2 is a schematic diagram according to an embodiment of the invention.

FIG. 2 illustrates an embodiment of the invention. An APS 20 includes an array of independently addressable pixels: arranged in n rows and m columns. An independently addressable pixel 22 in a row 24 includes a photodiode 26, a reset transistor 28, a source-follower output transistor 30, and a row select transistor 32. Pixels in each row are connected to a column 34. The bottom of each column of pixels has a load transistor 36 at a voltage V.ln, an output branch 38 to store the signal level for readout, an output branch 40 to store the reset level for readout, and an output branch 42 to store the signal level for a comparison to determine whether the pixel is saturated.

The signal branch 38 has a signal sample and hold (SH) element. This can include a sampling switch 46 and a holding capacitor 48. The reset branch 40 includes a sampling switch 52 and a holding capacitor 54. The comparator branch 56 includes a sampling switch 58 and a holding capacitor 60.

Comparator branch 42 is connected to an input node 62 of a comparator device 64. The other input node 66 of comparator 64 is connected to an analog voltage, V.adj, that is adjusted to set a minimum signal level.

The output of comparator 64 is connected to a latch 70 to latch the comparator output level after the comparison.

These readout and comparator circuits can be common to entire column 34 of pixels.

Each photodetector 26 in each pixel 22 in the array converts light energy received in the form of photons into an electrical charge. That charge corresponds to the amount of light that pixel receives prior to a read out function. Readout of pixel 22 for row 24 occurs in three stages: an image integration stage; a signal readout stage; and a reset stage.

Prior to readout, the voltage on photodiode 26 is reset voltage R. Reset voltage R is typically about 3 volts. After the pixel has been selected for readout, this voltage is integrated and decreases in response to incident light.

During the integration stage, light energy in the form of photons strikes photodiode 26. Ideally each photon creates an electron-hole pair in the photodiode. Photodiode 26 is designed to limit recombination between the newly formed electron-hole pairs. As a result, the photogenerated holes and electrons migrate during the integration stage. The photogenerated holes are attracted to the ground terminal of the photodiode, and the photogenerated electrons are attracted to the positive terminal of the photodiode. Each additional electron attracted to the positive terminal of photodiode 22 reduces the voltage on the photodiode from the reset value R. The integration stage typically takes about 1 $\mu$sec.

During the signal readout stage, the resultant signal voltage S on photodiode 26 is sampled onto signal branch 44. In a fully integrated pixel, corresponding to a brightest pixel in the image, the signal voltage S is about 1.5 volts.

During the reset stage, the value of the photodiode is reset to reset voltage R and this value is sampled onto the reset branch 42. The reset operation typically takes about 1 $\mu$sec.

The sensed light level read out from the pixel, that is the number of photons incident on the photodetector, is determined by calculating the difference between the reset level R and the signal level S.

Figure 3:
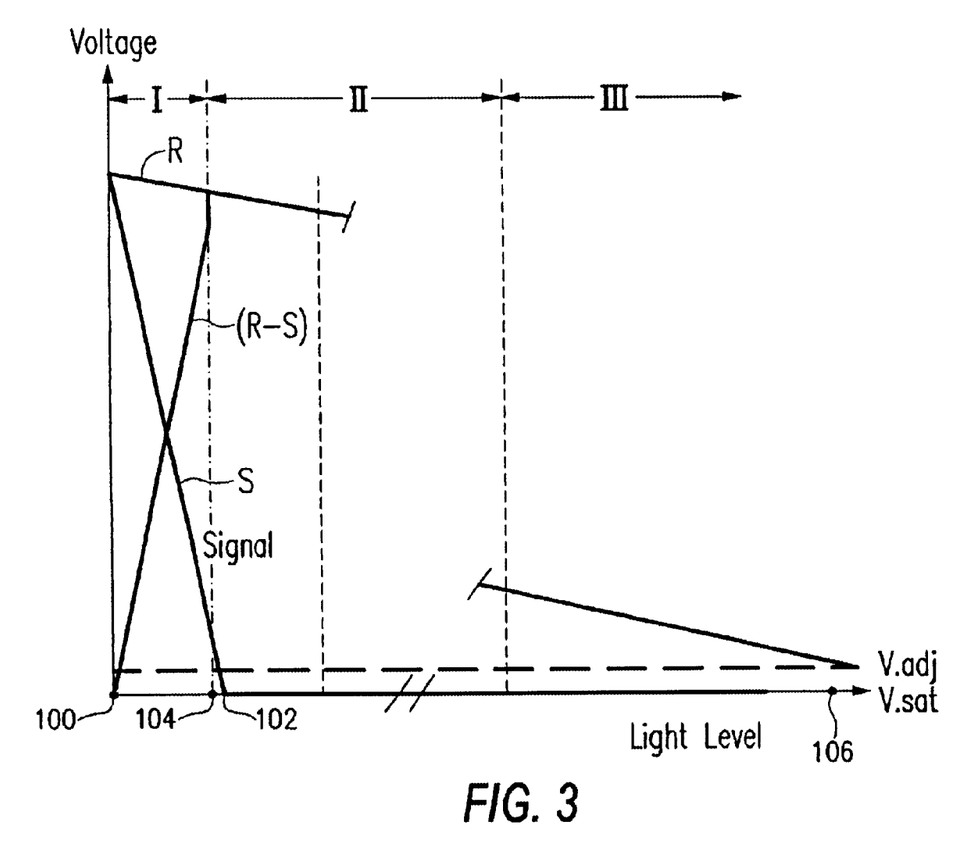
FIG. 3 is a chart showing the response of voltage levels to incident light levels according to the embodiment of FIG. 2.

FIG. 3 illustrates the response of the signal voltage S, reset voltage R, and a difference voltage (R–S) to an incident light level. Region I represents the normal operating range of a pixel. At a zero incident light level 100, a pixel in the resultant image is black. At a high incident light level 102, a pixel in the resultant image has a brightest value.

At high incident light level 102, photodetector 26 becomes unable to absorb additional photons during the integration period and saturates. According to the present invention, a saturation flag 80 is set for pixel 22 if photodiode 26 is saturated.

Returning to FIG. 2, V.adj is set slightly above V.sat which is typically about 1.5 volts. In operation, the signal voltage S sampled onto signal branch 38 is also sampled onto comparator branch 42 during signal readout.

If signal voltage S is greater than V.adj, comparator 64 output is LOW.

Signal voltage S will be less than V.adj for all light levels exceeding an incident light level 104 in Region I of FIG. 3. If signal voltage S is less than V.adj, the comparator output is HIGH, which represents a saturation flag 80.

The output of the comparator is stored in latch 70. The latch is enabled during column readout, by a column select transistor 82 and the value stored in the latch fed to the downstream column circuitry. Thus, for all incident light levels above incident light level 104, pixel 22 will have an associated saturation flag 80.

Figure 4:
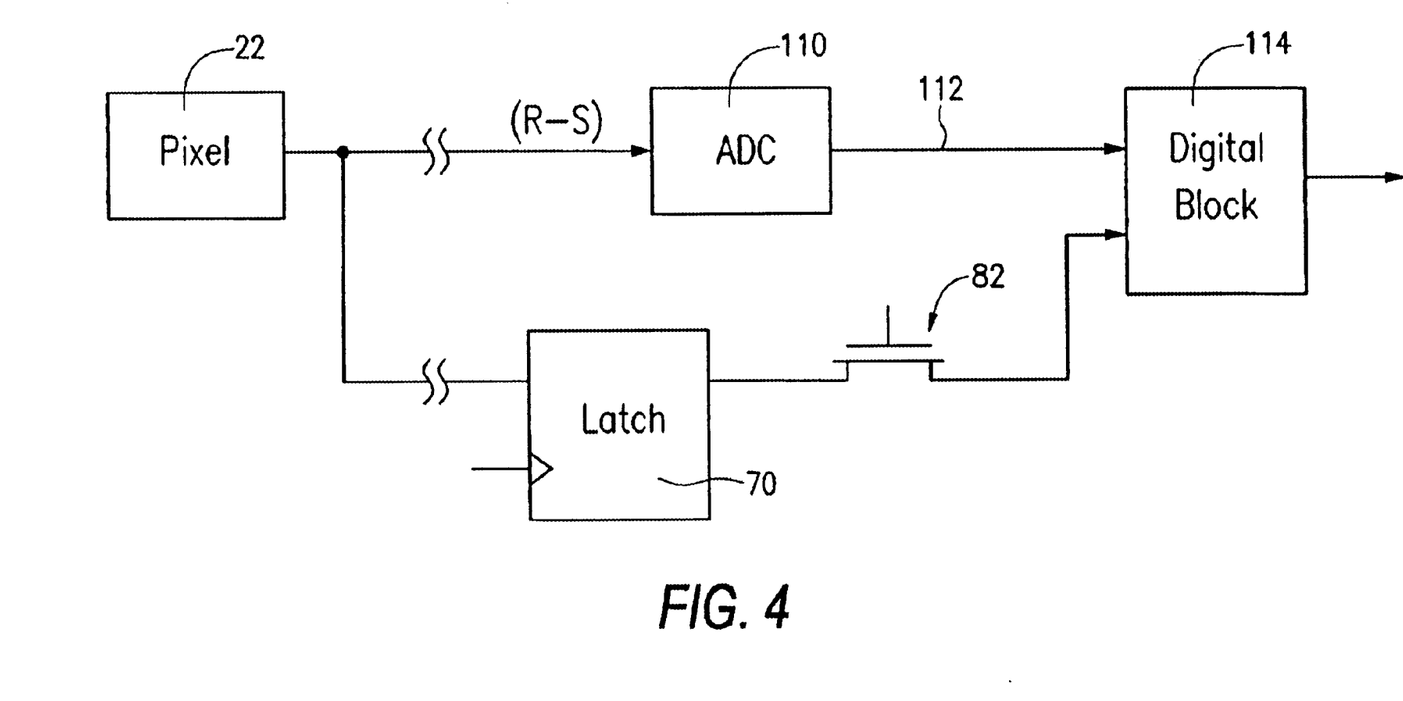
FIG. 4 is a schematic diagram showing another embodiment of the invention including digital processing circuitry.

According to the present embodiment, the APS CMOS device is a camera-on-a-chip device that includes on-chip analog-to-digital conversion (ADC) circuitry 110, as shown in FIG. 4. The ADC circuitry is contained in a digital block 112. Analog signals read out from a pixel are converted to digital signals which are processed in the digital block 112. The digital signals have a maximum value corresponding to the brightest level of the pixels in the image. For example, a maximum digital value for an 8-bit sensor would be 255 (corresponding to binary value "11111111").

The output of latch 70 for column 34 is passed to the digital block along with the analog signal (R–S) during readout of pixel 22. The analog signal is converted to a corresponding digitized value 114. If saturation flag 80 is detected, the digitized value from the ADC is replaced with the maximum digital value, e.g., 255 for an 8-bit sensor.

Thus, the signals read out from pixels receiving incident light levels greater than incident light level 104 in Region I of FIG. 3 will be replaced with the maximum digital value. Accordingly, the corresponding pixels in the image will be the brightest.

Operation of an APS according to the present embodiment will now be explained. For the purpose of illustration, a pixel exposed to a gradually increasing light level and read out incrementally is considered.

Referring to FIG. 3, at zero incident light level 100, signal voltage S equals reset voltage R. Consequently difference voltage (R–S) equals zero. The sensor reads a zero value as indicating that the pixel has received no incident light. A zero value produces a black pixel in the resultant image. In Region I, signal voltage S is strongly responsive to the incident light level. As the light level increases, signal voltage S decreases while reset voltage R remains relatively constant. Thus, difference voltage (R–S) increases, causing the pixel to brighten. Region I corresponds to the photodetector's active region.

According to the present embodiment, pixel 22 operating in Region I reads out a signal voltage S level greater than V.sat. Since signal voltage S>V.adj, the output of comparator 64 is LOW, indicating that the pixel is operating in the active region, i.e., not saturated. The LOW value is stored in latch 70. During the analog readout of column 34, the output of the latch is enabled and indicates no saturation flag.

Preferably pixel 22 is flagged prior to photodiode 26 saturating. At signal voltage S$\approx$V.adj, occurring at incident light level 104 (FIG. 3), the output of comparator 64 may be HIGH or LOW. However, this occurs at the transition between Regions I and II where reset voltage R>>V.sat. The presence of artifacts is not a problem where reset voltage R>>V.sat.A A saturated pixel reads out a signal level equal to V.sat. Since V.sat=signal voltage S<V.adj, the output of comparator 64 is HIGH. The HIGH value is stored in latch 70. During the analog readout of column 34, the output of latch 70 is enabled and indicates a saturated pixel. Saturation flag 80 is fed to the column circuitry. The saturation flag is used by the digital processing circuitry to replace the digitized value of the signal fed out from the pixel with the maximum (brightest) digital value for pixels in the image.

Ideally, reset voltage R is constant, However, as shown in Region II of FIG. 3, reset voltage R drops gradually in response to increasing light levels. This effect is due to pixel 22 still being exposed to light and hence producing electron-hole pairs during the reset stage. Since there is a finite time between setting the photodiode to the reset value and sampling the reset value onto reset branch 40, electrons generated in the photodiode by photons during the reset stage can migrate and reduce the voltage on the positive terminal of photodiode 26.

In Region I of FIG. 3, reset voltage R is relatively constant compared to S. However in Region II, reset voltage R gradually drops while signal voltage S remains constant at V.sat. Consequently, difference voltage (R−S) continues to drop with increasing light levels. In a conventional CMOS imager, the increasingly oversaturated pixel, which should appear to brighten in the image, actually reads out as a darkening pixel.

As shown in Region III, at an extremely high light level 106, reset voltage R will also saturate at V.sat and difference voltage (R−S) will equal zero, representing a black rl pixel. Regions of such oversaturated pixels produce artifacts in conventional CMOS imagers. FIG. 1 illustrates such an artifact 14 in an image 10 produced with a conventional CMOS imager in which the center of the sun 12 appears black.

In an APS according to the present embodiment, pixels exposed to light levels above light level 104 in Region I of FIG. 3 are flagged with an associated saturation flag 80 and the digital value output for such pixels is replaced with a maximum digital value, e.g., 255 in an 8-bit sensor, thereby preventing artifacts from being produced in the image.

Figure 5:
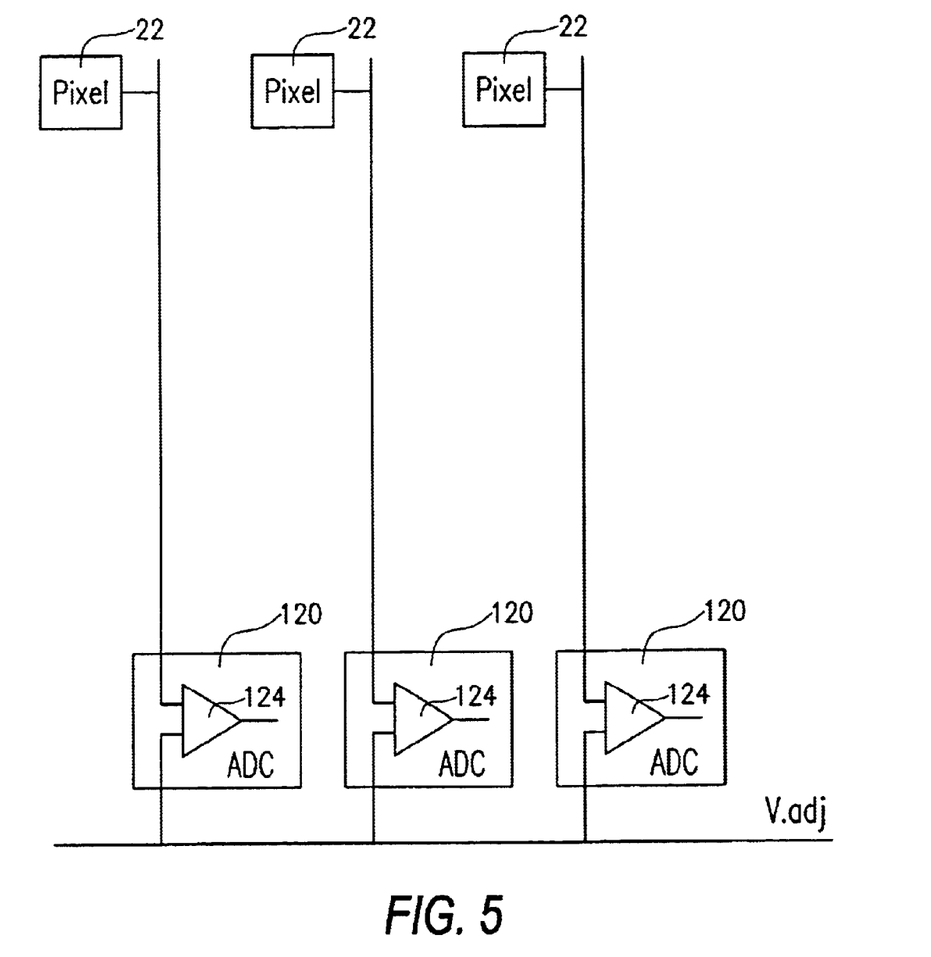
FIG. 5 is a schematic diagram showing another embodiment of the invention in which the APS has a column-parallel architecture.

In APS CMOS devices with a column parallel ADC design, each column includes an ADC for conversion of the pixel signal during readout. According to an alternate embodiment shown in FIG. 5, the comparison function is performed by a pre-existing comparator 124 in the ADC 120 in each column 122, rather than an additional comparator 64, as described above.

According to yet another embodiment, the reset level reset voltage R is sampled and compared to an analog voltage in Region II of FIG. 3, rather than the signal level S at V.sat.

A number of embodiments of the invention have been described. Nevertheless, it will be understood that various modifications may be made without departing from the spirit and scope of the invention. For example, the photodetector shown in FIG. 2 as photodiode 26 could be any photo-sensing element such as a photogate or pinned photodiode. Also, the digital processing circuitry described as being provided on-chip could be provided off-chip. Accordingly, other embodiments are within the scope of the following claims.

What is claimed is:

1. An active pixel sensor comprising:
   at least one pixel comprising a photodetector that outputs an output level indicative of incoming light;
   a first sample and hold element electrically connected to the pixel operating to store a signal output level during a readout operation;
   a second sample and hold element electrically connected to the pixel operating to store a reset level during a readout operation;
   a third sample and hold element electrically connected to the pixel operating to store the signal output level during a comparison operation;
   an adjusted saturated voltage source, comprising a node that provides an adjusted saturation voltage; and
   a comparator having a first input node operatively connected to the third sample and hold element, a second input node electrically connected to the adjusted saturation voltage node, and an output node, said comparator operating to output a signal indicating whether the adjusted saturation voltage exceeds the output level from the photodetector.

2. The active pixel sensor of claim 1 further comprising a latch inducting an input node and an output node, said input node operatively connected to the output node of the comparator operating to store a saturation flag in response to the adjusted saturation voltage exceeding the output level from the photodiode.

3. The active pixel sensor of claim 2 further comprising a select transistor operatively connected to the output node of the latch and operating to enable readout of the saturation flag during a readout operation for the pixel.

4. The active pixel sensor of claim 1 wherein the photodetector is a photodiode.

5. An active pixel sensor comprising:
   at least one pixel comprising a photodetector;
   a sample and hold element electrically connected to die pixel and operating to store a signal level on the photodetector during a signal readout operation;
   an adjusted saturated voltage source, comprising a node that provides an adjusted saturation voltage; and
   a comparator having a first input node operatively connected to the sample and hold element, a second input node electrically connected to the adjusted saturation voltage node, and an output node;
   a latch electrically connected to the comparator output node, said latch operating to store a saturation flag in response to the adjusted saturation voltage exceeding the signal level;
   a select transistor operatively connected to the output node of the latch operating to enable readout of the saturation flag during a readout operation for the pixel;
   a differencing element electrically connected to the pixel and operating to produce a difference level from the signal level and a reset level output from the pixel during the pixel readout operation;
   an analog-to-digital converter for converting the difference level into a difference digital value; and
   a digital output selector comprising
   a detector operatively connected to the latch output node,
   an input node electrically connected to the analog-to-digital converter and an output node, and
   a switch operating to switch the difference digital value on the output node to a maximum digital value in response to the detector detecting a saturation flag.

6. The active pixel sensor of claim 5, further comprising a plurality of pixels arranged in rows and columns.

7. The active pixel sensor of claim 6, wherein each column includes an analog-to-digital converter for converting the difference level into the difference digital value.

8. The active pixel sensor of claim 7, wherein the comparator is part of the analog-to-digital converter.

9. A method for flagging an oversaturated pixel in an active pixel sensor array, the method comprising:

reading a signal voltage from a pixel;

comparing the signal voltage to an adjusted saturation voltage, wherein said adjusted saturation voltage is set to a minimum signal level; and storing a saturation flag in response to the signal voltage exceeding the adjusted saturation voltage.

10. The method of claim 9 further comprising:

reading a reset voltage from the pixel;

calculating a digitized value for said pixel from the reset voltage and the signal voltage;

determining whether the pixel has an associated saturation flag;

replacing said digitized value with a maximum digital value in response to the pixel having an associated saturation flag.

* * * * *

UNITED STATES PATENT AND TRADEMARK OFFICE
CERTIFICATE OF CORRECTION

PATENT NO. : 6,873,363 B1
DATED : March 29, 2005
INVENTOR(S) : Sandor L. Barna et al.

It is certified that error appears in the above-identified patent and that said Letters Patent is hereby corrected as shown below:

Column 1,
Line 35, "active." should read -- active regions. --.

Column 5,
Line 34, "rl pixel" should read -- pixel --.

Column 6,
Line 25, "inducting" should read -- including --.
Line 38, "die" should read -- the --.

Signed and Sealed this

Fourteenth Day of June, 2005

JON W. DUDAS
*Director of the United States Patent and Trademark Office*